UNITED STATES PATENT OFFICE.

HEINRICH WIBO AUGUST THEODOR FRIEDRICHS, OF BERGEDORF, GERMANY.

PROCESS OF TREATING GROUNDNUTS AND PRODUCT DERIVED THEREFROM.

1,066,200. Specification of Letters Patent. Patented July 1, 1913.

No Drawing. Application filed February 12, 1912. Serial No. 677,077.

*To all whom it may concern:*

Be it known that I, HEINRICH WIBO AUGUST THEODOR FRIEDRICHS, a subject of the German Emperor, and resident of No. 5 Roonstrasse, in the town of Bergedorf, German Empire, have invented a new and useful Process of Treating Groundnuts and the Product Derived Therefrom, of which the following is a specification.

My invention relates to the treatment of kernels of the groundnut (*Arachis hypogæa*) and the product obtained thereby.

The object of the invention is to produce a substitute for almonds. The taste of almonds cannot be obtained to such an extent as to replace the nuts themselves, as the flavor of almonds is derived from the oil contained therein. But it is a well-known fact that, for example, the flesh of cocoanuts is frequently used as a substitute for almonds in confectionery for making almond biscuits, almond tarts and the like, and it is intended that the groundnut prepared according to the present invention shall answer as a substitute.

With this object in view, the kernels are at first roasted, care being taken that their flesh does not get brown. After the roasting, the husks can easily be removed, but it has been found that the kernel becomes brittle and, when comminuted, becomes a powdery mass. This brittleness, however, is removed by moistening the kernels with water after roasting and removing the husks. By this treatment they obtain the same flexibility and leatherlike toughness as boiled almonds so that they can be cut, planed or hacked. It also removes their characteristic earthy taste. Their taste can be further improved by adding to the softening water an etheric oil or an essence of any suitable qualities.

I claim:

1. The process of treating ground-nuts, which consists in slightly roasting groundnuts, removing their husks, and softening the roasted kernels with water.

2. The process of treating ground-nuts, which consists in slightly roasting groundnuts, removing their husks, and softening the roasted kernels with water and etheric oil.

3. A product consisting of slightly roasted, husked and softened kernels of groundnuts.

HEINRICH WIBO AUGUST THEODOR FRIEDRICHS.

Witnesses:
MAX F. A. KAEMPFF,
ERNEST H. L. MUMMENHOFF.